(12) United States Patent
Bielinski et al.

(10) Patent No.: US 11,423,797 B2
(45) Date of Patent: Aug. 23, 2022

(54) ANNOTATE A PASSAGE TO GRAPHICALLY DISPLAYS LOCATIONS AND TYPES OF MISTAKES

(71) Applicant: Pearson Education, Inc., Bloomington, MN (US)

(72) Inventors: John Bielinski, Bloomington, MN (US); Vishnu Vardhan Vanavada, San Antonio, TX (US); Valdas Volbekas, Austin, TX (US)

(73) Assignee: PEARSON EDUCATION, INC., Bloomington, MN (US)

( * ) Notice: Subject to any disclaimer, the term of this patent is extended or adjusted under 35 U.S.C. 154(b) by 325 days.

(21) Appl. No.: 16/526,871

(22) Filed: Jul. 30, 2019

(65) Prior Publication Data
US 2021/0035465 A1 Feb. 4, 2021

(51) Int. Cl.
*G09B 7/04* (2006.01)
*G09B 7/08* (2006.01)
*G09B 5/06* (2006.01)
*G06F 40/169* (2020.01)

(52) U.S. Cl.
CPC ............. *G09B 7/04* (2013.01); *G06F 40/169* (2020.01); *G09B 5/065* (2013.01); *G09B 7/08* (2013.01)

(58) Field of Classification Search
None
See application file for complete search history.

(56) References Cited

U.S. PATENT DOCUMENTS

| | | | | |
|---|---|---|---|---|
| 7,036,075 B2* | 4/2006 | Walker | .................. | G06F 40/103 715/201 |
| 8,226,416 B2* | 7/2012 | Abrash | .................. | G09B 19/06 434/185 |
| 2003/0087219 A1* | 5/2003 | Berger | ..................... | G09B 7/00 434/118 |
| 2006/0263756 A1* | 11/2006 | Berger | ..................... | G09B 7/00 434/323 |
| 2007/0040813 A1* | 2/2007 | Kushler | .............. | G06F 3/04883 345/173 |
| 2007/0160971 A1* | 7/2007 | Caldera | .................... | G09B 7/00 434/353 |
| 2012/0141967 A1* | 6/2012 | German | .................. | G09B 7/00 434/350 |
| 2013/0002719 A1* | 1/2013 | Ide | ...................... | G06F 3/04883 345/660 |

(Continued)

*Primary Examiner* — Justin S Lee
(74) *Attorney, Agent, or Firm* — Quarles & Brady LLP

(57) ABSTRACT

A passage of selectable words and/or selectable blank spaces may be displayed on a client device of an evaluator. As a test subject reads the passage, preferably from another source, the evaluator may select a selectable word or blank space. A plurality of selectable bubbles may appear near and/or around the selected word, where each selectable bubble corresponds to a type of mistake that the test subject might make in reading the passage. The evaluator may select one of the selectable bubbles depending on the type of mistake the test subject made. After selecting a bubble, the plurality of selectable bubbles are removed from the display and a tag icon, indicating which type of mistake the evaluator selected, is displayed near the selected word. In this manner, an annotated passage may be created that graphically illustrates where and what type of mistakes the test subject made in reading the passage.

20 Claims, 10 Drawing Sheets

(56) References Cited

U.S. PATENT DOCUMENTS

| | | | | |
|---|---|---|---|---|
| 2014/0012579 A1* | 1/2014 | Ganong, III | ............ | G10L 15/08 |
| | | | | 704/257 |
| 2014/0248591 A1* | 9/2014 | Skinner | ................. | G09B 7/063 |
| | | | | 434/178 |
| 2014/0315163 A1* | 10/2014 | Ingrassia, Jr. | ............ | G09B 5/02 |
| | | | | 434/169 |
| 2015/0104761 A1* | 4/2015 | Towle | .................... | G09B 19/04 |
| | | | | 434/169 |
| 2015/0278619 A1* | 10/2015 | Pakhchanian | ........ | G06K 9/2081 |
| | | | | 382/310 |
| 2017/0257329 A1* | 9/2017 | Tetreault | ............... | G06F 40/253 |
| 2018/0046331 A1* | 2/2018 | Monson | ................. | G10L 13/10 |
| 2018/0226101 A1* | 8/2018 | Taylor | .................... | G11B 27/02 |
| 2019/0066531 A1* | 2/2019 | Kaplan | ................. | G10L 15/26 |

* cited by examiner

ANNOTATE A PASSAGE TO GRAPHICALLY DISPLAYS LOCATIONS AND TYPES OF MISTAKES

FIELD OF THE INVENTION

This disclosure relates to the field of systems and methods configured to annotate a passage to graphically display locations and types of errors.

SUMMARY OF THE INVENTION

The present invention provides systems and methods of annotating a passage of words, displayed on a client device, by an evaluator. The annotations are preferably based on a verbal reading of the passage by a test subject.

The client device, operated by the evaluator, may display the passage that will be read by the test subject. The displayed passage may comprise a plurality of words where each word is separated from the next word by a blank space. Each word and each blank space in the passage is individually selectable on the client device. Thus, the passage comprises a plurality of selectable words and a plurality of selectable blank spaces.

The client device may receive during the assessment from the evaluator a selected word in the plurality of selectable words in the passage, where the evaluator has recognized a mistake by the test subject regarding the selected word.

A plurality of selectable bubbles may be displayed near the selected word, wherein each selectable bubble corresponds to a different type of reading mistake that is being tracked.

The client device may receive from the evaluator a selected bubble that is selected from the plurality of selectable bubbles displayed on the client device.

The plurality of selectable bubbles may be removed from the display of the client device. A first tag icon may be displayed near the selected word, wherein the first tag icon indicates which of the plurality of selectable bubbles (and thus which mistake type) was selected by the evaluator. A time indicator may also be displayed near the selected word that indicates when the evaluator selected the selected bubble, preferably in reference from the time the test subject started to read the passage.

In some embodiments, the client device may also receive from the evaluator a selected blank space between two words in the passage. A second tag icon may be displayed near the selected blank space to indicate that the evaluator noted the test subject added words to the passage at the location of the selected blank space.

In some embodiments, a running total for one or more of the types of mistakes that are being tracked may also be displayed on the display of the client device of the evaluator.

The above features and advantages of the present invention will be better understood from the following detailed description taken in conjunction with the accompanying drawings.

DETAILED DESCRIPTION

Figure 1:
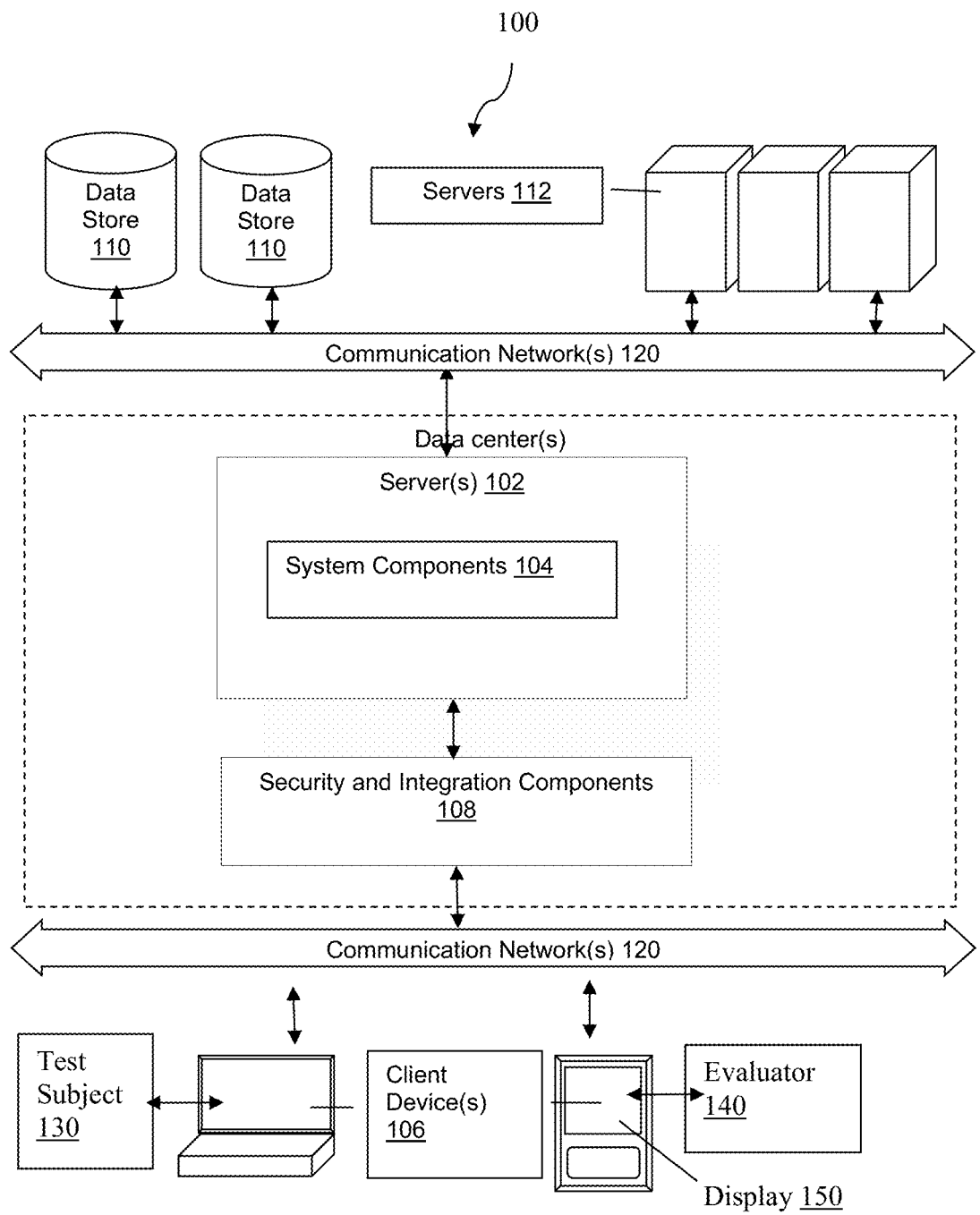
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
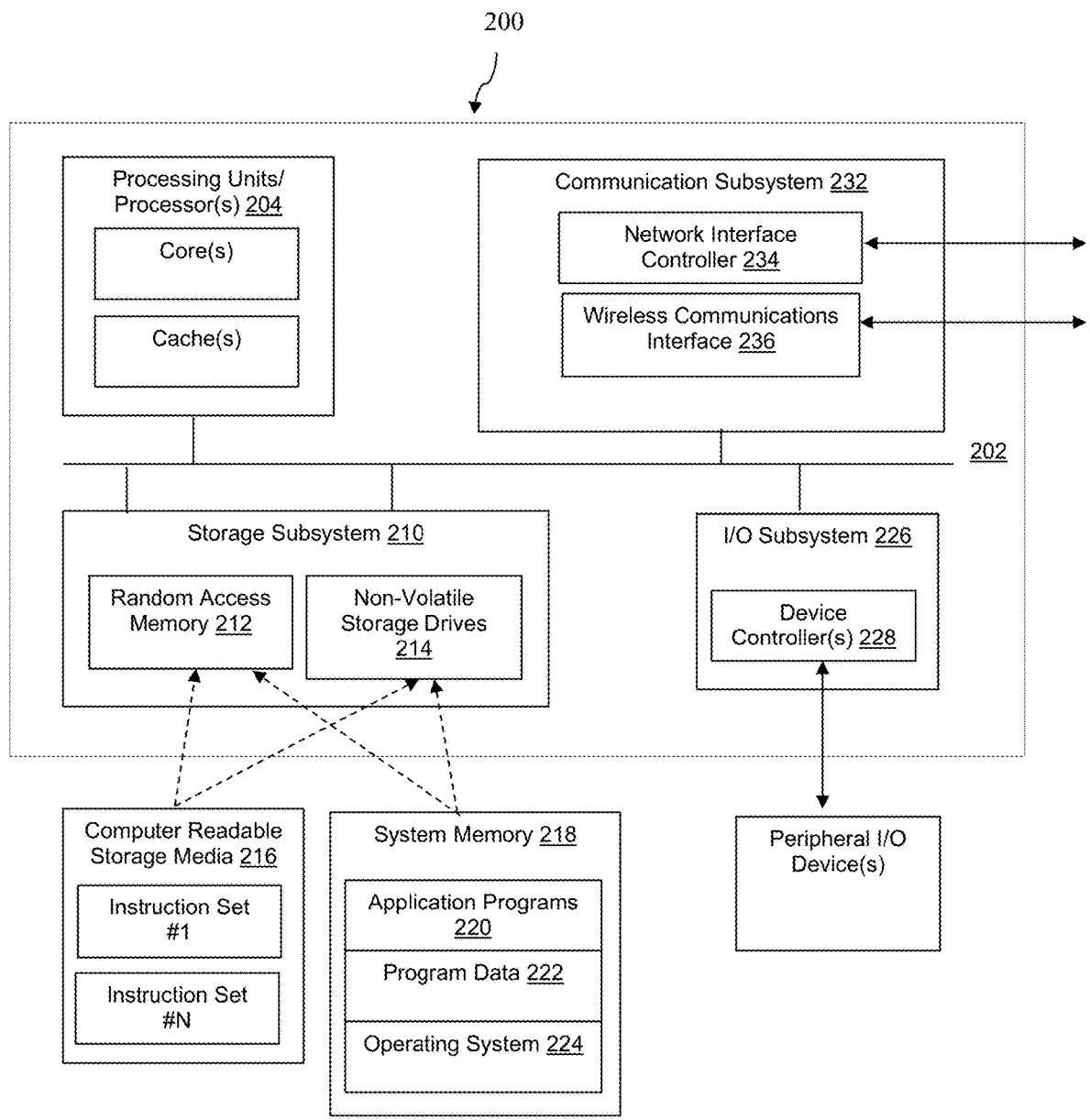
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

COMPUTER SYSTEM

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

There may be times an evaluator 140 desires to test a reading ability of a test subject 130. However, it is often difficult for the evaluator 140 to properly create a record of the reading ability of the test subject 130. This is often caused by the fact that the test subject 130 may be able to read at a faster pace than the evaluator 140 is able to record of the reading ability of the test subject 130. The present invention is directed towards systems and methods that allow the evaluator 140 to create a record (the later described annotated passage 600) for the reading ability of the test subject 130 in real-time, even when the test subject 130 is able to read at a relatively fast pace. Thus, the present invention has the advantage of allowing an annotated record to be created even for test subjects 130 that are able to read at a fairly fast rate.

Figure 3:
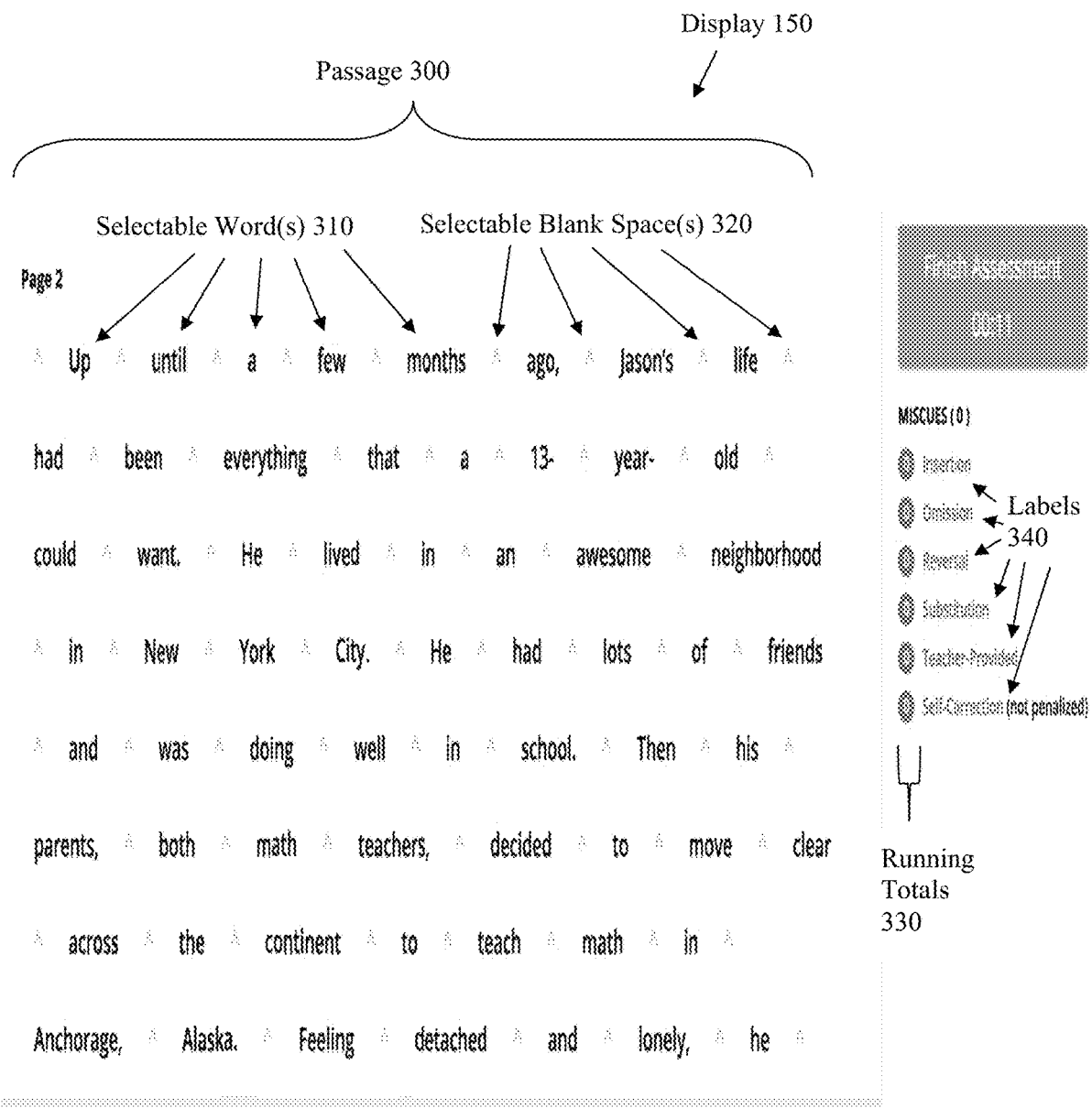
FIG. 3 illustrates a passage to be read by a test subject as the passage is displayed on a display of a client device of the evaluator.
Figure 7:
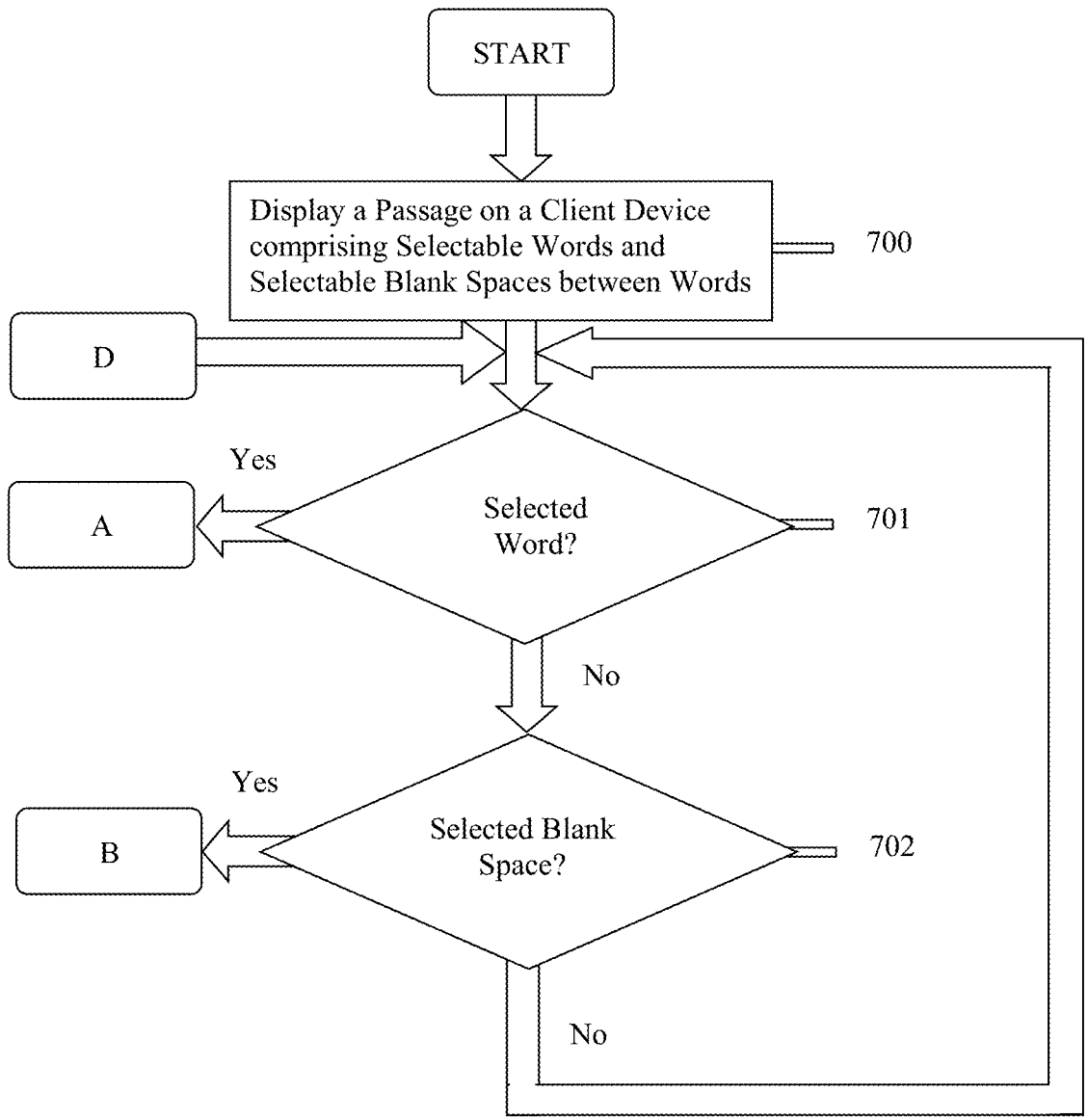
FIGS. 7-10 illustrate a flow chart of one possible method of using the invention.

Referring to FIGS. 3 and 7, the test subject 130 may read a passage 300, wherein the passage 300 comprises a plurality of words separated by a plurality of spaces. The test subject 130 may read from a hardcopy, such as a paper or a book, but in preferred embodiments, the test subject 130 is reading the passage 300 on a display 150 of a client device 106 operated by the test subject 130. The passage 300 may appear in any desired format that allows the test subject 130 to read the passage 300. The passage, whether a hardcopy or on the display 150, of the test subject 130 does not change during the process described below, only the display 150 of the evaluator 140 changes.

The evaluator 140 may also have the passage 300 on a display 150 of a different client device 106 operated by the evaluator 140. The passage 300 may be displayed on the display 150 of the client device 106 as shown in FIG. 3. In preferred embodiments, each word in the passage 300 is separated from the next word by a blank space. In preferred embodiments, the space between words on the display 150 for the evaluator 140 are wider than is normal. The width of the blank spaces between the words may be any desired width, but are preferably the width of the average width of four or more characters in the words. In a preferred embodiment, the blank spaces between words may include an appearance of a symbol, preferably displayed in a subtle manner. As a non-limiting example, the blank spaces between the words in FIGS. 3-6 include a "^" symbol. In preferred embodiments, any symbols used between words in the blank space is done in a subtle manner so as to not distract from the words in the passage 300, but provide for a specific point the blank space may be selected.

On the display 150 of the client device 106 of the evaluator 140, the words and/or the blank spaces may be selectable. Thus, the passage 300 comprises a plurality of selectable words 310 and/or a plurality of selectable spaces. (Step 700) The selectable words 310 and the selectable spaces may be selected by the evaluator 140 using any desired technique, now known or developed in the future. As non-limiting examples, the evaluator 140 may use a mouse to select a selectable word or a selectable space or the evaluator 140 may use a finger to touch a selectable word or a selectable space if the display 150 is a touch-screen.

As specific examples of selectable words 310, in FIG. 3 the words "Up," "until," "a," "few" and "months" are marked as selectable words 310. In preferred embodiments, all of the words in the passage 300 are selectable words 310 and the evaluator 140 may select any number of the selectable words 310 deemed necessary by the evaluator 140 in assessing the reading ability of the test subject 130.

As specific examples of selectable blank spaces 320, in FIG. 3 the blank spaces between the words "months," "ago," "Jason's," "life" and "had" are marked as selectable blank spaces 320. In preferred embodiments, all of the blank spaces between words in the passage 300 are selectable blank spaces 320 and the evaluator 140 may select any number of the selectable blank spaces 320 deemed necessary by the evaluator 140 in assessing the reading ability of the test subject 130.

Figure 10:
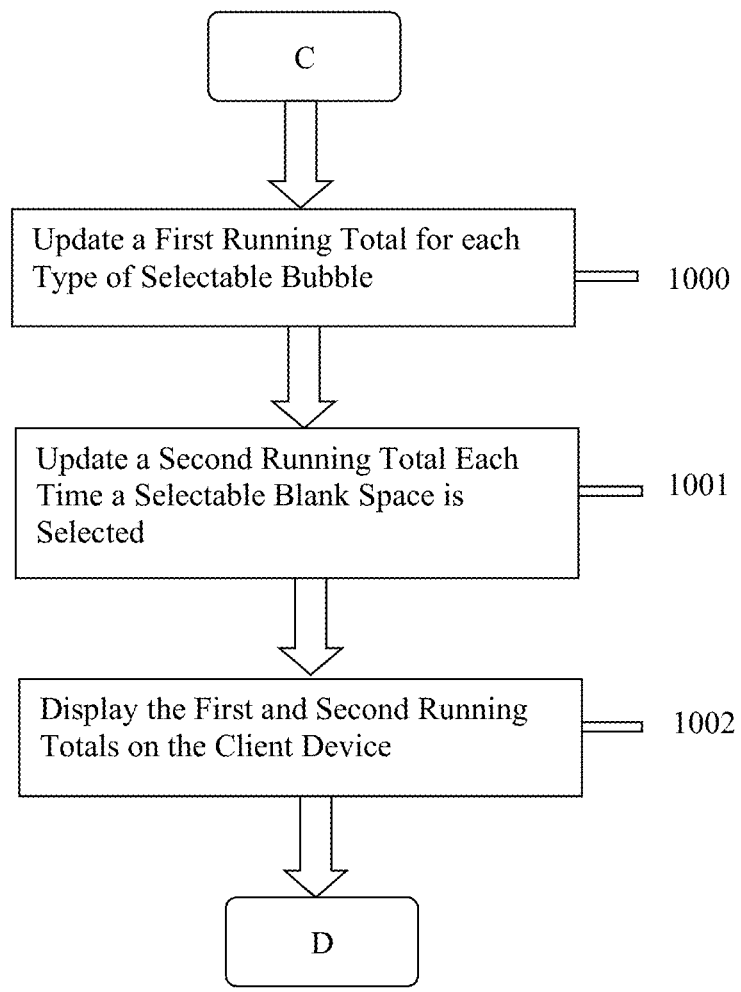

FIG. 3 also illustrates an example of a plurality of running totals 330 of errors or problems detected by the evaluator 140 as the test subject 130 reads the passage 300. Referring to FIG. 10, the present invention may automatically keep track of a number of times a particular error was made while the test subject 130 was reading the passage 300. The present invention may track any number of different errors and any type of error. As non-limiting examples of the types of errors that may be tracked and recorded by the present invention, the display 150 lists the labels 340 of "Insertion," "Omission," "Reversal," "Substitution," "Teacher-Provided" and "Self-Correction."

In a preferred embodiment, the present invention keeps a running total of these errors as the evaluator 140 assesses the reading ability of the test subject 130. As an example, a running total for a particular type of mistake may be updated each time the evaluator 140 selects the corresponding type of selectable bubble (Step 1000). As a specific example, each time the evaluator 140 selects a selectable bubble for an omission type of mistake, the running total for omission types of mistakes may be incremented by one. If the evaluator 140 selects a blank space between words to indicate the mistake of extra words being read into the passage 300, a running total for insertions may be incremented by one. (Step 1001) The running totals 330 may be updated on the display 150 each time the evaluator 140 selects a selectable blank space or a selectable word. (Step 1002)

Figure 9:
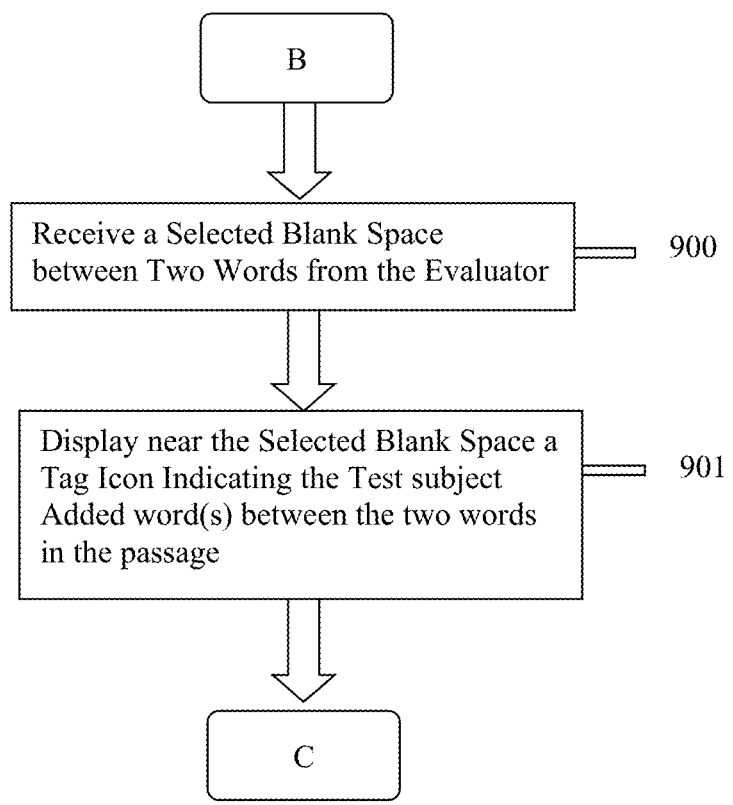

As the test subject 130 reads the passage 300, the evaluator 140 may detect that the test subject 130 added words that were not in the passage 300. Referring to FIG. 9, the evaluator 140 may select a selectable blank space between two words in the passage 300 where the words were added by the test subject 130. (Steps 702, 900) The invention may automatically add a tag icon near the selected blank space to indicate an insertion error was made by the test subject 130 at that location in the passage 300. (Step 901) As a specific example, the tag icon may be "AW" to indicate the spot between words were the test subject 130 added words to the passage 300. In another embodiment, when a test subject 130 adds words, either a selectable word in front or a selectable word in back of the added words may be selected and a selectable bubble indicating words were added may be displayed near the selected word 400. The running total for insertions may be increased by one no matter which method is used to indicate words were added to the passage 300 by the test subject 130.

As the test subject 130 reads the passage 300, the evaluator 140 may detect that the test subject 130 made an error. As previously stated, the error may be of any desired type that is desired to be tracked. As non-limiting examples, the error may be an omission (the word was not spoken by the test subject 130), reversal (neighboring words were spoken in reverse order by the test subject 130), substitution (the wrong word(s) was spoken by the test subject 130), teacher-provided (the evaluator 140 spoke the word for the test subject 130) and/or self-corrected (after saying the wrong word, the test subject 130 spoke the correct word). Any of these, any combination of these and/or any other types of errors may be a plurality of errors tracked as part of the present invention.

Figure 8:
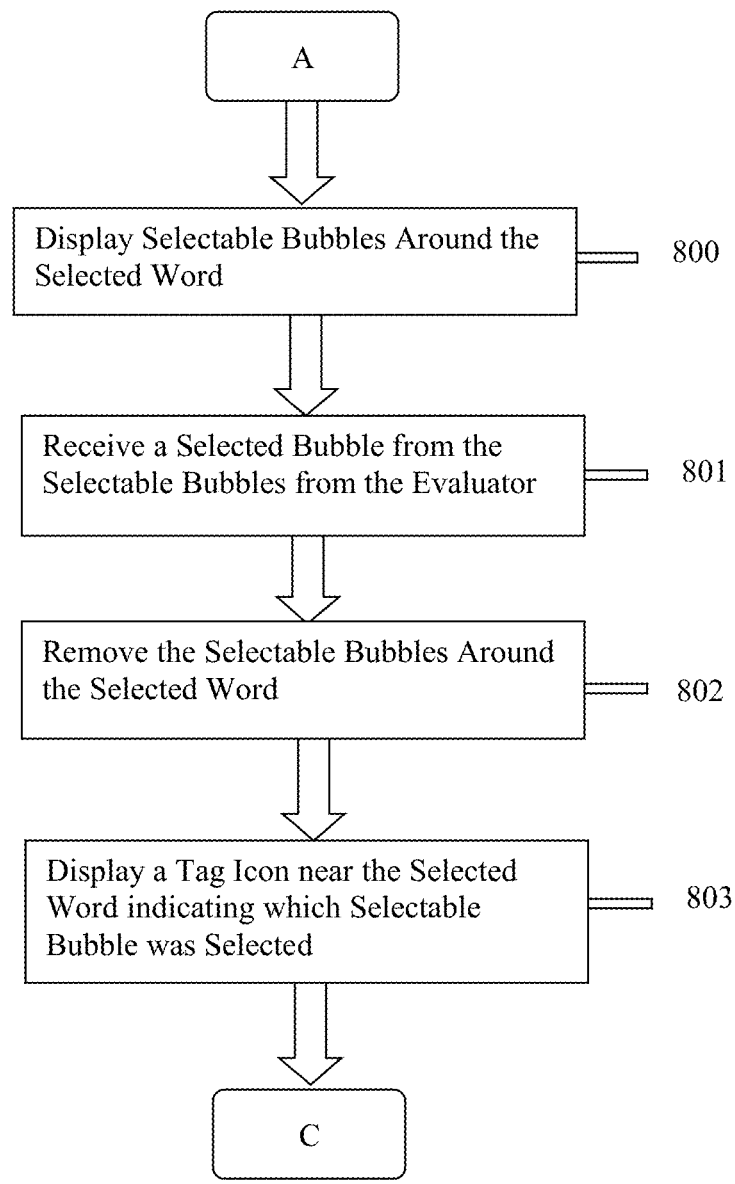

Once an error is detected by the evaluator 140, the evaluator 140, in real-time while the test subject 130 continues to read the passage 300, may select a selectable word in the plurality of selectable words 310 in the passage 300 where the test subject 130 made the error. (Step 701) Referring to FIG. 8, the display 150 on the evaluator's client device 106 may automatically display a plurality of selectable bubbles 410 near and/or around the selected word 400 automatically triggered by the selection of the selectable word 400. (Step 800) In preferred embodiments, each selectable bubble has a description or an acronym in or on the selectable bubble to assist the evaluator 140 in selecting the selectable bubble that most closely describes the error committed by the test subject 130 while reading the passage 300.

Figure 4:
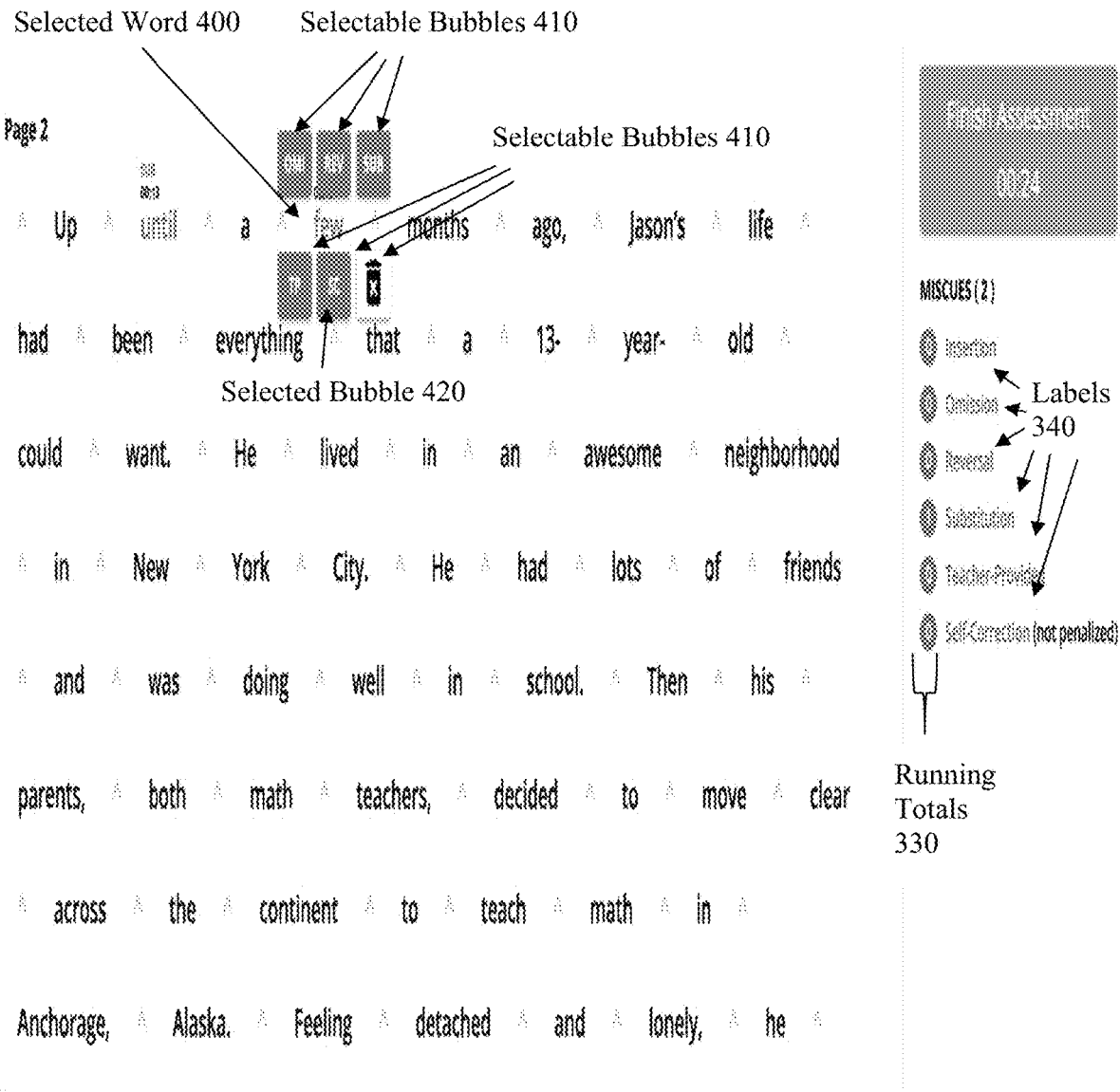
FIG. 4 illustrates the passage, which comprises a plurality of selectable words and/or a plurality of selectable blank spaces, after the word "few" has been selected and a plurality of selectable bubbles has been displayed near and/or around the selected word.

As a specific example of a display 150 of selectable bubbles 410, FIG. 4 illustrates six selectable bubbles 410. One of the example selectable bubbles 410 is labeled "OMI" for an omission of a word type of mistake, one of the example selectable bubbles 410 is labeled "REV" for a reversal of words type of mistake, one of the example selectable bubbles 410 is labeled "SUB" for a substitution of words type of mistake, one of the example selectable bubbles 410 is labeled "TP" for a teacher-provided word type of mistake and one of the example selectable bubbles 410 is labeled "SC" for a test subject 130 self-corrected type of mistake. Of course, other labels 340 may be used to indicate the type of mistakes that are being tracked. In some embodiments, the evaluator 140 may select which types of mistakes the evaluator 140 wishes to track and then only selectable bubbles 410 of the type of mistake that the evaluator 140 wishes to track are displayed.

The example in FIG. 4 also illustrates an example selectable bubble of "X" which may be used when the evaluator 140 made a mistake and did not intend to select the selectable word or the evaluator 140. When the evaluator 140 selects the selectable bubble of "X" the present invention may stop considering the selected word 400 to be a selected word 400 and remove all the selectable bubbles 410 around the selected word 400.

As a non-limiting example, FIG. 4 illustrates a specific example displayed on the display 150 of the evaluator 140 (which would be displayed without the reference labels and reference numbers). The evaluator 140 may have determined that the test subject 130 self-corrected regarding the selectable word "few." The evaluator 140 may select the selectable word "few," using any desired technique, causing the invention to automatically display a plurality of selectable bubbles 410 near and/or around the selected word 400 "few," where each selectable bubble represents a type of error that is being tracked by the evaluator 140. After selecting the selected word 400, the evaluator 140 may select the selectable bubble 310 that corresponds most closely to the detected mistake of self-corrected. (Step 801) After the evaluator 140 selects one of the selectable bubbles 410, i.e., the selected bubble 420, all of the selectable bubbles 410 are removed from the display 150 of the evaluator 140. (Step 802)

In preferred embodiments, selected words 400, where a mistake was indicated by the evaluator 140, may have their appearance altered so that the selectable words 310 where mistakes were made may be easily seen. In some embodiments, some types of mistakes may cause a selected word 400 to have its appearance changed while other types of mistakes might not cause a selected word 400 to have its appearance changed. As a specific example, the mistakes of "Omission," "Reversal," "Substitution" and "Teacher-Provided" may cause a selected word 400 to have a different appearance (such as a change in color, size or font) while the mistake of "Self-Corrected" might not cause the appearance of the selected word 400 to have its appearance changed.

After the evaluator 140 selects a selectable bubble and the selectable bubbles 410 have been removed from the display 150, a tag icon may be displayed next to or near the selected word 400. (Step 803) In preferred embodiments, the tag icon indicates which selectable bubble, and thus which type of mistake, was selected by the evaluator 140. In this manner, the evaluator 140 may select any number of different selectable blank spaces 320 and/or any number of selectable words 310 where the evaluator 140 has detected a mistake from the test subject 130.

In some embodiments, a time indicator may also be displayed next to or near the tag icon and the selected word 400. The time indicator may indicate when the evaluator 140 selected the selectable bubble (which should correspond approximately with the time when the test subject 130 read the selected word 400). In preferred embodiments the time indicator may be a time from when the test subject 130 first started reading the passage 300.

Figure 5:
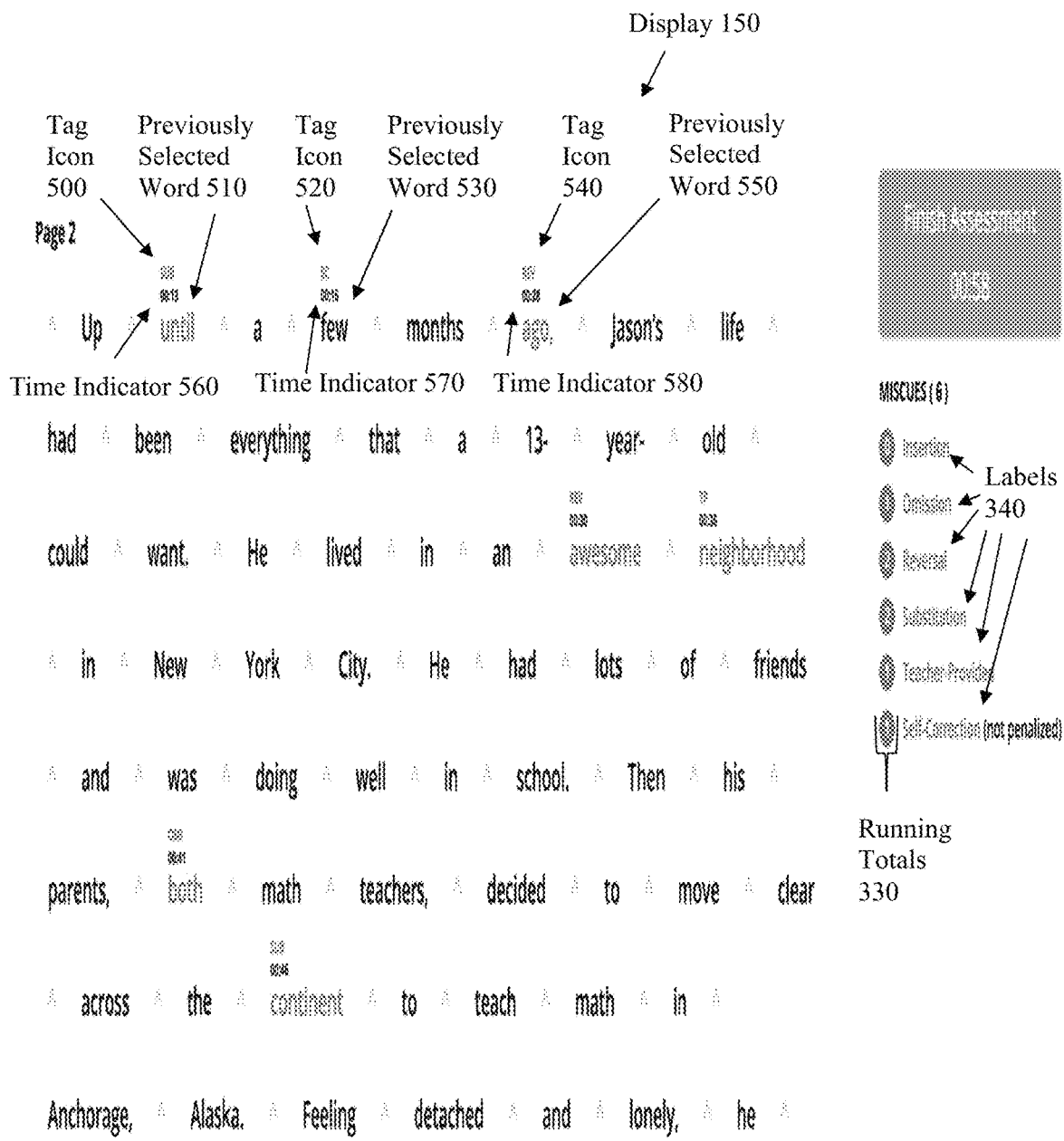
FIG. 5 illustrates the passage after tag icons and time indicators have been added after the evaluator has selected a selectable bubble for each of a plurality of selected words, thereby creating an annotated passage that graphically displays the locations and types of errors made by the test subject.
Figure 6:
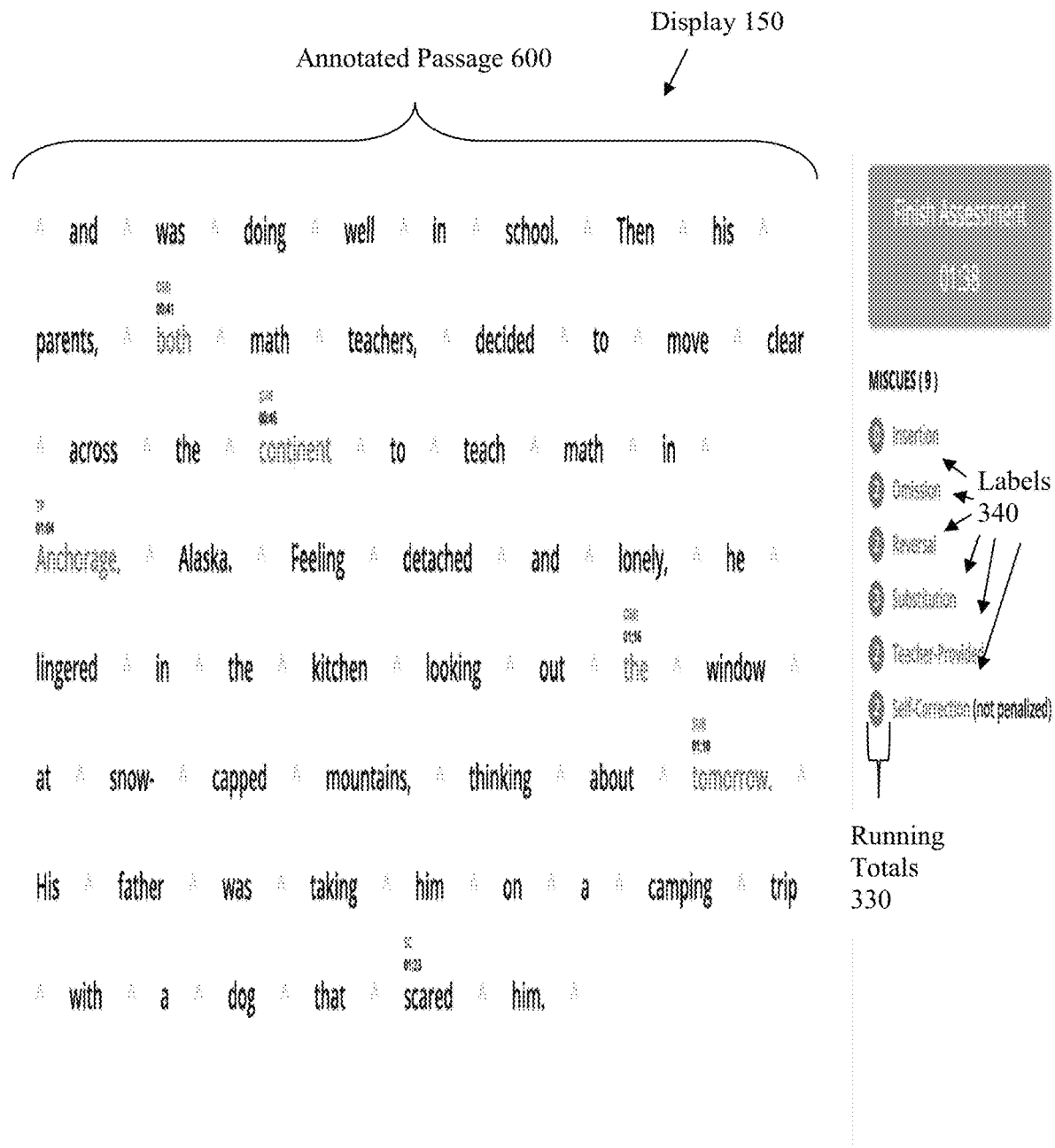
FIG. 6 illustrates an annotated passage that may be scrolled up or down on the display of the evaluator.

FIGS. 5 and 6 illustrate specific examples of a display 150 on a client device 106 of an evaluator 140 during an assessment of a reading ability of a test subject 130 using the process described above. FIGS. 5 and 6 illustrate that a number of mistakes were recorded by the evaluator 140, thereby creating an annotated passage 600. As an example, the annotated passage 600 indicates that "until" was a previously selected word 510 by the evaluator 140 and the tag icon 500 (SUB) indicates the evaluator 140 selected a selectable bubble that indicates the test subject 130 made a substitution type of mistake. The annotated passage 600 also includes a time indicator 560 that indicates a time of "00:13," which preferably indicates the evaluator 140 selected the error of substitution 13 seconds after the test subject 130 started reading the passage 300.

As another example, the annotated passage 600 indicates that "few" was a previously selected word 520 by the evaluator 140 and the tag icon 530 (SC) indicates the evaluator 140 selected a selectable bubble that indicates the test subject 130 made a self-correction type of mistake. The annotated passage 600 also includes a time indicator 570 that indicates a time of "00:16," which preferably indicates the evaluator 140 selected the error of self-corrected 16 seconds after the test subject 130 started reading the passage 300.

As yet another example, the annotated passage 600 indicates that "ago" was a previously selected word 550 by the evaluator 140 and the tag icon 540 (REV) indicates the evaluator 140 selected a selectable bubble that indicates the test subject 130 made a reversal of words type of mistake. The annotated passage 600 also includes a time indicator 580 that indicates a time of "00:28," which preferably indicates the evaluator 140 selected the error of reversal 28 seconds after the test subject 130 started reading the passage 300.

In this manner, the evaluator 140, anyone else or an analyzer function (such as artificial intelligence (AI) or a smart machine) may review and/or analyze the annotated passage 600 to determine how the evaluator 140 assessed the reading ability of the test subject 130 as the test subject 130 read the passage 300.

In some embodiments, a recording of the reading of the passage 600 by the test subject 130 may be created and stored in a fileserver or database. This embodiment allows the evaluator 140 to create the annotated passage 600 any time after the test subject 130 has read and recorded the passage 600, i.e., the annotated passage 600 may not be created in real-time as is done in the other embodiments. In this embodiment, an AI may be used to analyze the recorded reading, while in other embodiments, the AI may be used to analyze the annotated passage 600.

FIG. 6 illustrates how the passage 300 may scroll up or down the display 150 of the client device 106 when the passage 300 is longer than the display 150 can display all at one time.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method of annotating a passage of words, displayed on a client device, by an evaluator based on a verbal reading of the passage by a test subject, comprising the steps of:

displaying on a display on the client device operated by the evaluator the passage that will be read by the test subject, wherein the passage comprises a plurality of words, each word in the plurality of words is separated from the next word in the passage by a blank space and each word in the plurality of words and each blank space between two words is individually selectable on the client device;

receiving by the client device from the evaluator a selected word in the passage;

in response to receiving the selected word in the passage, displaying by the display near the selected word a plurality of selectable bubbles, wherein each selectable bubble is selectable by the evaluator and is associated with a type of verbal reading error;

receiving by the client device from the evaluator a selected bubble that is selected from the plurality of selectable bubbles;

removing the plurality of selectable bubbles near the selected word from the display of the client device;

displaying on the display near the selected word a tag icon, wherein the tag icon indicates which of the plurality of selectable icons was selected by the evaluator;

for each selectable bubble in the plurality of selectable bubbles, updating a running total for the number of times the evaluator selected that type of selectable bubble; and displaying on the client device the running total and a label for each selectable bubble in the plurality of bubbles.

2. The method of claim 1, wherein the plurality of selectable bubbles comprises an omission bubble and a substitution bubble, wherein the omission bubble indicates the test subject did not say the selected word and the substitution bubble indicates the test subject said a wrong word instead of the selected word in the passage.

3. The method of claim 1, further comprising the step of:
altering, based on the selected bubble, the appearance of the selected word in the passage on the display of the client device.

4. The method of claim 1, wherein a first size of each selectable bubble is larger than a second size of the tag icon.

5. The method of claim 1, wherein a time indicator is displayed next to a corresponding tag icon.

6. The method of claim 1, wherein the displaying by the display near the selected word the plurality of selectable bubbles further comprises displaying by the display around the selected word the plurality of selectable bubbles.

7. A method of annotating a passage of words, displayed on a client device, by an evaluator based on a verbal reading of the passage by a test subject, comprising the steps of:
displaying on the client device operated by the evaluator the passage that will be read by the test subject, wherein the passage comprises a plurality of words, each word in the plurality of words is separated from the next word in the passage by a blank space and each word in the plurality of words and each blank space between two words is individually selectable on the client device;
receiving by the client device from the evaluator a selected word in the passage;
in response to receiving the selected word in the passage, displaying near the selected word a plurality of selectable bubbles, wherein each selectable bubble is selectable by the evaluator and is associated with a type of verbal reading error;
receiving by the client device from the evaluator a selected bubble that is selected from the plurality of selectable bubbles;
removing the plurality of selectable bubbles near the selected word from the display of the client device; and
displaying near the selected word a tag icon, wherein the tag icon indicates which of the plurality of selectable bubbles was selected by the evaluator.

8. The method of claim 7, wherein the plurality of selectable bubbles comprises an omission bubble and a substitution bubble, wherein the omission bubble indicates the test subject did not say the selected word and the substitution bubble indicates the test subject said a wrong word instead of the selected word in the passage.

9. The method of claim 7, wherein the plurality of selectable bubbles comprises an omission bubble, a reversal bubble, a substitution bubble, an evaluator-provided bubble and a self-correction bubble.

10. The method of claim 7, further comprising the step of:
altering the appearance of the selected word in the passage.

11. The method of claim 7, wherein a first size of each selectable bubble is larger than a second size of the tag icon.

12. The method of claim 7, wherein a time indicator is displayed next to a corresponding tag icon.

13. The method of claim 7, wherein the displaying near the selected word the plurality of selectable bubbles further comprises displaying around the selected word the plurality of selectable bubbles.

14. A method of annotating a passage of words, displayed on a client device, by an evaluator based on a verbal reading of the passage by a test subject, comprising the steps of:
displaying on the client device operated by the evaluator the passage that will be read by the test subject, wherein the passage comprises a plurality of words, each word in the plurality of words is separated from the next word in the passage by a blank space and each word in the plurality of words and each blank space between two words is individually selectable on the client device;
receiving by the client device from the evaluator a selected word in the passage;
in response to receiving the selected word in the passage, displaying near the selected word a plurality of selectable bubbles, wherein each selectable bubble is selectable by the evaluator and is associated with a type of verbal reading error;
receiving by the client device from the evaluator a selected bubble that is selected from the plurality of selectable bubbles;
removing the plurality of selectable bubbles near the selected word from the display of the client device;
displaying near the selected word a first tag icon, wherein the first tag icon indicates which of the plurality of selectable bubbles was selected by the evaluator;
receiving by the client device from the evaluator a selected blank space between two words in the passage; and
displaying near the selected blank space a second tag icon, wherein the second tag icon indicates the test subject added words between the two words in the passage.

15. The method of claim 14, wherein the plurality of selectable bubbles comprises an omission bubble, a reversal bubble, a substitution bubble, an evaluator-provided bubble and a self-correction bubble.

16. The method of claim 14, further comprising the step of:
altering the appearance of the selected word in the passage.

17. The method of claim 14, wherein a time indicator is displayed next to a corresponding tag icon.

18. The method of claim 14, wherein the displaying near the selected word the plurality of selectable bubbles further comprises displaying around the selected word the plurality of selectable bubbles.

19. The method of claim 3, wherein altering the appearance of the selected word includes altering at least one selected from a group consisting of a color of the selected word, a font of the selected word, and a size of the selected word.

20. The method of claim 5, wherein the timer indicator indicates when the evaluator selected the selected bubble.

* * * * *